US008431862B2

(12) United States Patent
Kachline (10) Patent No.: US 8,431,862 B2
(45) Date of Patent: Apr. 30, 2013

(54) TORCH FOR ELECTRIC ARC WELDING SYSTEM

(75) Inventor: Jeffrey L. Kachline, Highland Hts., OH (US)

(73) Assignee: Lincoln Global, Inc., City of Industry, CA (US)

( * ) Notice: Subject to any disclaimer, the term of this patent is extended or adjusted under 35 U.S.C. 154(b) by 1179 days.

(21) Appl. No.: 11/210,286

(22) Filed: Aug. 25, 2005

(65) Prior Publication Data

US 2007/0051711 A1 Mar. 8, 2007

(51) Int. Cl.
*B23K 9/10* (2006.01)
*B23K 9/12* (2006.01)

(52) U.S. Cl.
USPC ............... 219/130.01; 219/137.71; 219/130.5

(58) Field of Classification Search ............... 219/130.5, 219/137.7, 137.71, 137.9, 483, 130.01; 483/7, 483/8, 9, 10, 11, 16, 901
See application file for complete search history.

(56) References Cited

U.S. PATENT DOCUMENTS

| | | | | |
|---|---|---|---|---|
| 4,742,470 | A * | 5/1988 | Juengel | ............... 700/175 |
| 5,512,726 | A | 4/1996 | Arantes et al. | |
| 6,315,186 | B1 | 11/2001 | Friedl | |
| 6,498,321 | B1 | 12/2002 | Fulmer | |
| 6,758,423 | B1 * | 7/2004 | Perkins et al. | ............... 239/690 |
| 6,841,752 | B2 | 1/2005 | Ward | |
| 6,855,914 | B1 * | 2/2005 | Kaufman et al. | ........ 219/137.71 |
| 2003/0029851 | A1 * | 2/2003 | Suzuki et al. | ............ 219/130.01 |
| 2003/0093503 | A1 * | 5/2003 | Yamaki et al. | ................ 709/220 |
| 2004/0173583 | A1 * | 9/2004 | Iriyama et al. | ........... 219/121.53 |
| 2005/0103768 | A1 | 5/2005 | Ward | |
| 2006/0196862 | A1 * | 9/2006 | Sickels | ...................... 219/130.5 |

FOREIGN PATENT DOCUMENTS

| | | |
|---|---|---|
| EP | 0 508 482 A2 | 10/1992 |
| EP | 0 854 006 A1 | 7/1998 |
| EP | 1 117 279 A1 | 7/2001 |
| JP | 63114823 A * | 5/1988 |

(Continued)

OTHER PUBLICATIONS

Machine translation of Japanese Publication No. JP 2004-322127 A, Nov. 2010.*

(Continued)

*Primary Examiner* — M. Alexandra Elve
*Assistant Examiner* — Hemant Mathew
(74) *Attorney, Agent, or Firm* — Hahn Loeser & Parks LLP (57) ABSTRACT

A torch for connection to an electric arc welding system having a wire feeder, a power source and a weld process controller for the power source. The torch being connected to the front end of a welding gun, which gun has a rear end with a first unique component of a connector. The welding system has a second component of the connector matching the first component. The gun has a communication channel extending from the torch to the first component for transmitting data to the welding system through the connector. The torch has a memory with an identification code outputted on the communication channel to the first component and the system has a decoder circuit connected to the second component and responsive to a selected identification code.

15 Claims, 6 Drawing Sheets

FOREIGN PATENT DOCUMENTS

| | | | |
|---|---|---|---|
| JP | 06 023550 A | | 2/1994 |
| JP | 07068423 A | * | 3/1995 |
| JP | 07276062 A | * | 10/1995 |
| JP | 2004322127 A | * | 11/2004 |
| WO | WO 98/34751 A1 | | 8/1998 |
| WO | WO 02/47860 A1 | | 6/2000 |
| WO | WO 00/44523 A1 | | 8/2000 |
| WO | WO 03/002296 A1 | | 1/2003 |

OTHER PUBLICATIONS

Chinese Office Action dated Jun. 6, 2008 for application No. 200610121839.6 (translation with original).

European Search Report for European Patent Application No. EP 1 757 397 A1.

* cited by examiner

TORCH FOR ELECTRIC ARC WELDING SYSTEM

The present invention relates to electric arc welding and more particularly to a unique torch specially designed for increasing the transfer of intelligence between the torch and an electric arc welding system adapted to receive the torch.

BACKGROUND OF INVENTION

The invention involves the design of a unique torch for use with an electric arc welding system where the torch has special abilities to communicate with the welding system and the system is adapted to receive the torch. In Friedl U.S. Pat. No. 6,315,186 a special designed torch includes an input device and a display device on the torch itself so that a dedicated line is used to communicate data from the torch to the electric arc welding system being used with the torch. The system can identify the torch and change parameters of the welding process implemented by the welding system. The parameters are changed on the torch itself and are communicated by a single communication line to set and select parameters for the welding system. The alleged novelty is a single communication line, but not details of the communicated data or the response of the system to the data. This patent is incorporated by reference herein for its background technology and for the description of a torch with an input device, as well as a torch mounted display device. In a like manner, Kaufman U.S. Pat. No. 6,855,914 is incorporated by reference. The welding system identifies the impedance of the torch to decide the type of torch connected to the welding system, whether a push-pull torch or merely push torch. Identification of the type of torch connected to the system is used to set a parameter, such as the motor speed for the wire driven through the gun or torch to the welding operation. This background patent utilizes the system itself to determine the type of torch and does not employ the torch as the source of multi purpose intelligence to control the weld process of the welding system. These two patents comprise the background to which the present invention is directed and disclose only primitive communication between the welding torch and the welding system.

THE INVENTION

In the welding industry, the term "gun" is used in the welding industry to describe an elongated, flexible harness called the "cable" comprising an isolation tube with a rear end connectable to a welding system of the type including a wire feeder and power source with controller. The front end of the "gun" has a torch to perform the welding operation. The terms "torch" and "gun" are often used interchangeably to mean either the welding head or the whole unit. In this description the welding head is called a "torch."

In accordance with the present invention the torch at the end of the gun is modified and especially designed to communicate with a welding system also designed for receiving the special type of torch. Thus, the torch has a special design and the welding system has an input terminal structure or receptacle communicated with special architecture and components in the welding system to identify the special torch and receive information in digital format from the torch. The information is used to operate the controller of the welding system. Consequently, in one feature of the invention, the torch includes an internal register or memory having a unique digital identification code or other means to communicate its identity to a specially designed welding system. By (a) allowing the torch to identify its unique characteristics and/or its specific identity and (b) communicating data from the torch through a digital channel to the welding system, several unique capabilities are made possible. The special torch and modified welding system constitute companion components facilitating communications between the two components for the purposes of enhancing the overall efficiency of the welding operation and improving the quality control and inventory requirements for the torch itself.

In accordance with one aspect of the invention, the torch is connected to an electric welding system having a wire feeder with a feed motor, a power source and a weld process controller for the power source and the wire feeder to cause a selected welding process. The torch has a memory device for storing an identification code unique to the torch and a transmission line or communication channel to output the identification code in digital format. A unique receptacle with a plug and receptacle having a unique pin pattern allows connection of the torch, through an elongated tube or gun, to the welding system. The welding system to which the torch is connected by a unique receptacle has a torch monitoring device with an input terminal connected to the transmission line or channel when the torch is connected to the system. This monitoring device has an input decoder circuit to identify the torch and to activate the monitoring program tailored to the particular torch being identified. In this aspect of the invention, the monitoring device includes at least one accumulator for totaling a first torch use factor based upon a selected weld parameter or combination of parameters. A circuit is used to enable the accumulator when a specific torch is connected to the input terminal of the weld system. The accumulator has an output signal representing the total of the major parameter. A program selected by connecting the specific torch creates or outputs a limit value for the use factor being monitored. A comparator network is provided with a first input being the accumulator output signal and a second input being the limit value from the selected program determined by the actual torch connected to the welding system. The comparator network creates an action signal when the output of the accumulator reaches the limit value from the selected program. In this manner, the torch is connected to the welding system and the monitor is operated based upon a selected program coordinated with a particular torch. When a torch use factor being monitored reaches a given value, an action signal is created. The action signal indicates a corrective action to be taken, such as changing the liner of the gun, changing the contact tip of the torch or replacing and/or refurbishing the total torch. Consequently, whenever a given torch is connected to the welding system, a monitor measures one or more use factors. The use factors are stored until the next use of the particular unique torch. Ultimately, the torch, either during a single application or subsequent uses of the same torch, will pass a use factor limit value to identify an action to be taken, such as maintenance of the particular torch. In accordance with an aspect of the invention, the condition of the use factor can be displayed at the monitor or at a remote location by an hard wire or an ethernet communication network. Consequently, whenever a torch is applied to the welding system, the identification code is read by the welding system and the monitor is initiated to accumulate a use factor or factors for the particular, unique torch.

In accordance with another aspect of the present invention, the torch, with a unique identification stored in memory or register, can also include a manually operated input device on the torch itself to create an output signal with digital data identifying a specific weld process. A communication channel directs data from the torch to the controller where a circuit shifts the weld process of the controller. In this manner, an input set circuit responsive to the digital data from the torch sets the weld process of the controller to a specific weld process selected at the torch. In this embodiment of the invention, the weld process selected at the torch is based upon the type of process and the diameter and/or type of welding wire for the particular process. Thus, an operator indexes the torch between weld processes and diameters or types of wire at the torch itself. Then, the torch transmits such data from the torch to a set circuit of the controller so the controller is set to perform the process selected at the torch. Consequently, the identification code stored in the torch is used to select the monitor and monitor the operation of the torch, while the torch itself is used to set the particular weld process of the controller used for controlling the power source and/or the wire feeder.

The object of this aspect of the invention is the provision of a torch which has an identification code transmitted to the welding system for actuating a monitor to maintain information regarding historical use of the torch. Furthermore, the torch is provided with a process selector so the operator can convert process data into digital information and transmit such data through an information channel to the set circuit for the power source controller of the welding system. Thus, the individual torch is monitored and the torch is used, alternatively, to control the actual weld process performed by the welding system.

In a second embodiment of the invention, the torch does not have a stored identification code, but it has a communication line or channel directly attached to the set input circuit of the power source controller. Consequently, by merely connecting the gun with a front end torch to the welding system, the communication channel with the controller is established. The welding system in this embodiment of the invention does not have a torch monitor, but has a controller with an input set circuit that can be actuated by a gun having a particular input communication line or channel designed to match the receptacle at the input of the welding system. The rear end of the gun is connected to the wire feeder using a special connector with matching plug and receptacle. Consequently, in this second embodiment of the invention, the torch is merely connected to the electrical welding system. The torch has a set up device for manually selecting the welding parameters of the welding process and a line communicating the selected parameter in digital format to the torch itself. From the torch, the digital data is directed through a communication line coextensive with the tube comprising the gun. The line extends from the torch to the controller to thereby set the parameters from the torch in the controller to perform the weld process. The set up device can be separate from the torch to adjust the value of parameters, such as wire feed speed, current and voltage and accessories, such as the type of gas. These parameters and accessories are loaded manually into the set up device which device is then connected to the memory of the torch. The torch memory device communicates this information to the input set circuit of the controller in the welding system. A specially designed torch is necessary, since only a special torch can have the communication line extending from an internal memory device storing the parameters through the special receptacle of the welding system. In another application of this concept, the set up device is loaded with an identification code which can be used as defined above to enable the circuit for accepting data when the torch having such data is used. In accordance with an aspect of the invention, the set up device is a separate unit that merely introduces the set parameters and the torch identification code into a memory, such as through a touch memory button on the torch. The data is thereby loaded into the torch for subsequent use when the torch is connected to a welding system. Connection is allowed by a communication port in a connector on the system. This connector is unique to the communication line from the torch and includes a plug and receptacle with a matching unique pin pattern. By using this second embodiment, other operating features can be incorporated with the torch.

In one implementation, a torch can be loaded with a set of parameters for the weld process. Thus, whenever this torch is connected to the welding system the controller is automatically set to perform the desired weld process. This modification has an advancement where a toggle mechanism on the torch toggles between a plurality of sets of parameters. Then the parameter set is selected by the toggle mechanism and is connected to the weld system. The controller is automatically shifted to the desired parameters. Another implementation involves a personal parameter setting device or module. A welder has his own monitor. When he is ready to weld, he merely loads the parameters from his own module into a torch. The torch is thereby set to the parameters tailored by the welder. This loads these personal parameters into the controller by connecting the torch to the welding system by way of a special connector at the rear end of the flexible tube or gun.

A third embodiment of the invention involves a torch for connection to an electric welding system, as defined above. The torch has a register with a unique identification code, in digital format so that the torch is connected by communication channel to an interface module activated by a given code and/or codes. One code that activates the interface is the unique code of a particular torch connected to the welding system. The interface has an output that sets the weld process parameters. The output channel of the interface transmits digital data to the controller that has a set up circuit for storing the transmitted digital data as control parameters for the power source. Thus, by merely connecting a particular torch to the welding system, the torch is identified and is allowed to activate an interface module. This module sets the parameters in the controller used by the welding system. The identification code for the torch is in memory or register on the torch and is directed through a unique connector to the ID terminal of the interface module. The controller is set in response to the identification code stored on the individual torch. Another aspect of such a torch is the setting of the weld parameters on the torch itself. The parameters are selected and optionally displayed on the torch; however, they are also communicated to the interface for the purposes of changing the parameters stored in the interface modules. Thus, the torch is identified and activates the interface to operate the controller. As an option, the torch itself is normally adjusted to change the output parameter of the interface. Consequently, the torch by being connected to the welding system activates an interface to set the controller to the desired parameters, which parameters may or may not be changed manually by a welder at the torch itself.

In accordance with a fourth embodiment of the invention, a unique torch design is provided wherein the torch itself can include a monitoring system. A first sensor in the torch measures the level of arc current and a second sensor in the torch also measures the level of the wire feed speed to the torch. These measurements multiplied by time are accumulated to create use factors as explained in connection with the first embodiment. A memory unit associated with the torch itself stores the use signal or signals and a monitor reads the use signals. This monitor can be in the form of a touch memory button. The use factor information is stored on the torch and is read from the torch or displayed on the torch. Consequently, the torch can be interrogated to determine how much use it has experienced and whether it is capable for a subsequent, long term welding application. By this embodiment of the invention, the torch carries with it a use history which is readable directly or indirectly from the torch. This ability to know the use history of a torch is of substantial benefit for inventory control. Furthermore, it prevents a torch from being placed into an application for which it does not have residual life to complete.

A fifth embodiment of the invention is a torch with a unique identification code stored in the torch itself. This code is used with a controller including a closed loop circuit to control the weld parameters, such as current and/or voltage and a network to create a special weld procedure. The torch, with the unique identification code stored on the torch, creates an output signal which is decoded for identification by the welding system. Receipt of the proper code creates a network enabling signal. This can be accomplished by connecting the lead carrying the unique identification code from the torch to the welding system. By attaching the novel torch, the network enabling signal is created by a decoded identification of the proper torch. This signal activates the network and converts the controller to the special weld procedure. In this manner, a particular torch designed for a given special operation of the controller is the only type of torch which can activate the special alternative weld procedure. This embodiment of the invention assures that a special torch is used when a special welding process is implemented by the welding system.

These and other designs of the torch for a welding system are aspects of the present invention which will be described in more detail later. The original claims are incorporated by reference herein as disclosure.

The primary object of the present invention is the provision of a torch for an electric welding application, which torch is coordinated with the welding system. When the torch is connection to the system, the torch communicates with the welding system to facilitate accurate monitoring of the torch and/or proper welding using a specific torch.

Another object of the present invention is the provision of a torch, as defined above, which torch has a stored digital identification code indicative of either the particular torch itself for the purposes of inventory and maintenance or a type of torch for the purposes of coordinating the operation of the torch with the welding system and/or modifying the welding process performed by the welding system. The use of a novel torch that communicates with the welding system to perform diverse operations and function is the overall object of the invention.

Yet another object of the present invention is the provision of a torch, as defined above, which torch transmits an identification code to start a monitor associated with each individual torch. The monitor stores information based upon operation of the torch for the purposes of subsequent inventory and/or maintenance of the torch. Furthermore, such torch, with a stored identification code, has the desired characteristics required by a particular welding system to which the torch is connected and for performing a desired welding process.

Another object of the present invention is the provision of a welding torch, as defined above, which welding torch transmits digital information from the torch to the welding system. The information is readable only by a dedicated welder having an input connector comprising a receptacle and port with matching pi patterns. The connector allows the system to receive and process transmitted digital information from the torch.

Still a further object of the present invention is the provision of a torch, as defined above, which torch includes a monitor or a torch mounted monitoring device to record and store the history of a particular torch based upon use factors so a torch with very little life will not be used in an application requiring long term operation. Thus, the invention avoids mismatching of a torch history and the application to which the torch is intended.

Still a further object of the present invention is the provision of a welding torch, as defined above, which welding torch is used to activate a unique specially designed welding system through the setting of parameters in the power source controller or otherwise.

Yet another object of the invention is the provision of a torch which is loaded with desired weld parameters so when the torch is connected to the weld system the system is programmed by the torch. Thee loaded parameters can be adjusted and carried with the torch.

A further object of the invention is the provision of a torch which can be programmed by an operator with a personalized set-up unit or module so the operator merely loads a torch when he is ready to use the torch (any torch) for a given weld process.

These and other objects and advantages will become apparent from the following description taken together with the accompanying drawings.

PREFERRED EMBODIMENTS

In electric arc welding applications, a torch is located on the front end of an elongated flexible tube called a "gun" connected by a plug/receptacle with a welding system. Such system normally includes a wire feeder and a power source provided with a controller to operate the power source and/or the wire feeder to move welding wire through the gun and the torch to the welding operation at a desired wire feed speed with the desired voltage and current characteristic to perform a specific welding process dictated by the setting of the controller. The present invention involves novel torches, each of which is combined with a modified welding system that accommodates the torch and communicate with the torch in novel combinations of elements. These torch/welding system combinations facilitate the welding operation by using intelligence supplied by the torch. The torches of this invention each have a special design different from common torches normally used in the welding industry.

Figure 1:
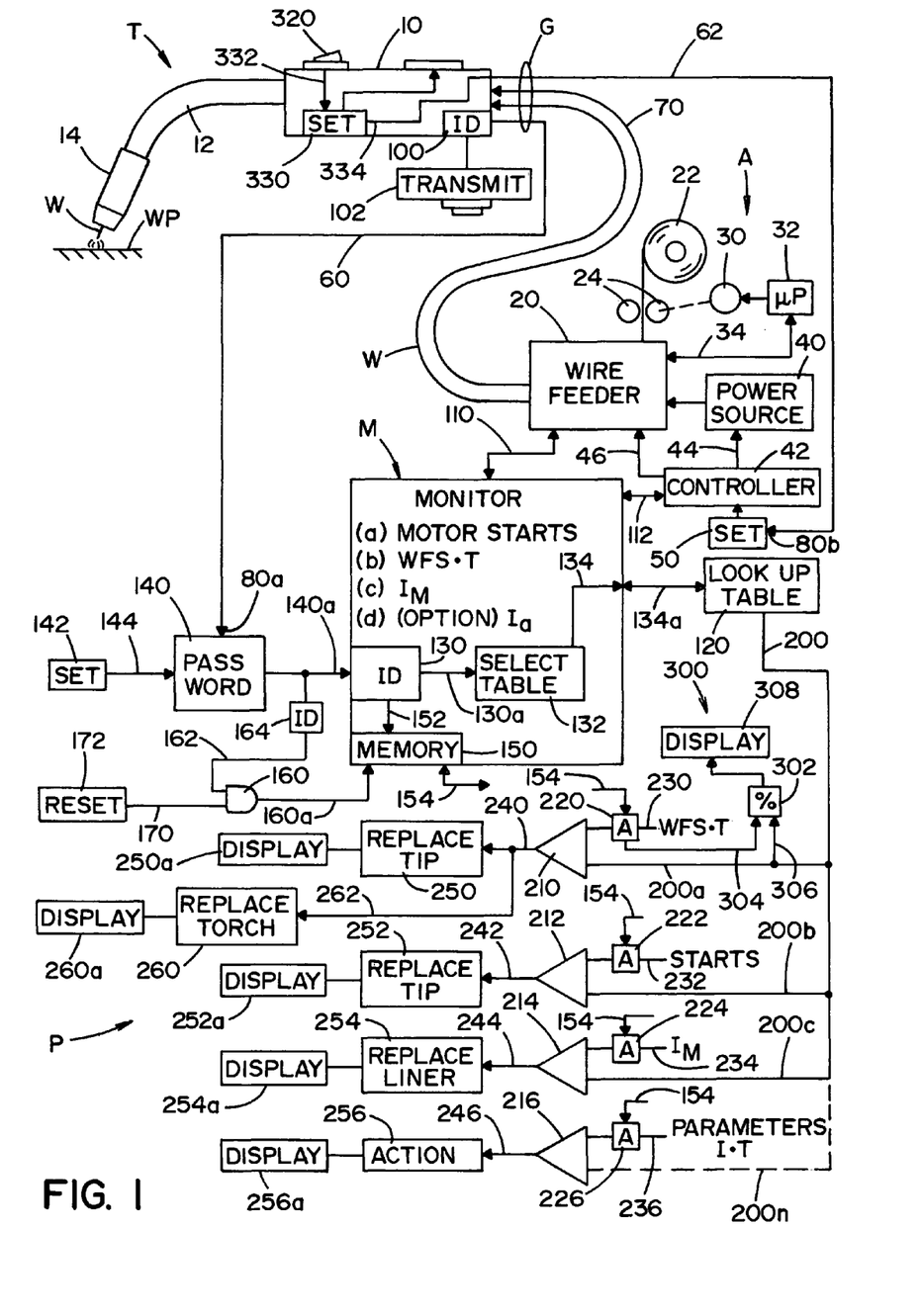
FIG. 1 is a schematic, combined wiring and block diagram illustrating a first embodiment of the present invention.
Figure 2:
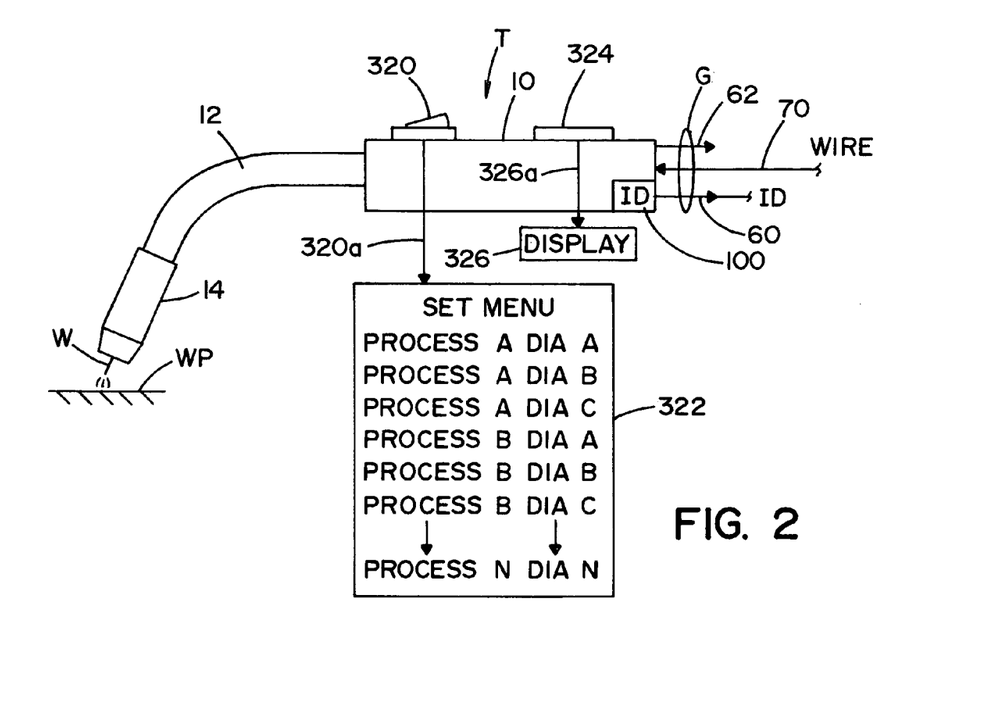
FIG. 2 is a schematic illustration of certain structures employed in the embodiment shown in FIG. 1.

The first embodiment of the invention is shown in FIGS. 1 and 2 wherein specially designed torch T has a handle, illustrated as a broomstick type handle 10, with an outwardly extending gooseneck 12 terminating in a lower nozzle 14 through which welding wire W is pushed toward workpiece WP to perform a welding process between welding wire W and the workpiece WP. As is normal in the welding industry, welding system A is communicated with torch T and includes a wire feeder 20 having a supply of welding wire 22 pulled by feed rolls 24 driven at a wire feed speed determined by motor 30 under the control of microprocessor 32. The microprocessor receives wire feed speed commands through control lead 34 normally connected to wire feeder 20 and having an internal microprocessor control chip not illustrated. To provide current for the welding operation, system A includes power source 40 with controller 42 having output lead 44 for controlling the operation of the power source and lead 46 for controlling the operation of wire feeder 20. The controller itself can provide the information on lead 34 to set the speed of the motor 30 so the desired wire feed speed is used in accordance with the needs of the particular welding process being performed by system A. Torch T is connected to the front end of the elongated, flexible cable or gun G having an outer sheath covering designated leads 60, 62 which leads constitute a unique structure to the present invention. Gun G also houses moving welding wire W and power lead 70 as is common in the welding industry. The rear end of elongated gun G is connected to system A by special connectors 80a, 80b to accept the special designated lead 60, 62. The connectors are one unit with a plug and receptacle with matching pin patterns. The gun also has a trigger lie to start the welding operation. Of course, the gun also provides a gas passage for shielding gas to be provided at the welding operation if the welding operation is not self-shielding. As so far described, torch T and system A are standard welding components except for the designated lead 60, 62 and the special combined connectors 80a, 80b used to accept the rear end of gun G carrying not only a wire W, power lead 70 and a gas conduit, but also designated leads 60, 62. In operation, controller 52 operates wire feeder 20 and power source 40 for driving wire W through torch T as a designated welding process is performed. The process has specific parameters, such as current voltage and wire feed speed dictated by the setting of controller 42. Into this standard architecture, the present invention is incorporated.

In accordance with the invention, torch T includes an internal memory or storage register 100 for storing an identification code. The code is indicative of particular unique torch T. By depressing transit button 102, the unique torch specific digital code in memory or register 100 is transmitted through designated line 60 to portion 80a of the combined connector. This connector is at the input of monitor M for monitoring the operation of the unique torch T. Monitor M includes a digital processing device, such as a DSP or microprocessor, to perform the functions hereinafter explained after receipt of digital data from controller 42 by way of inputs 110 and 112. Input 110 reads and retrieves appropriate data from wire feeder 20, while input 112 reads and retrieves appropriate data from controller 42. This data is processed by monitor M to generate information regarding the operation of torch T. The torch information is used for servicing and inventory purposes associated with the particular unique torch T. Monitor M has an internal digital decoder 130 connected to the input of connector portion 80a. The decoder outputs on line 130a the identity of the particular torch T connected to connector portion 80a. This information is generally related to the specific torch. It is directed by lead 130a to a select table routine or program 132 so that data on output line 134 identifies unique specific torch T. This information is directed by line 134a to a look up table 120 storing a multiple of programs, each of which includes a limit value for a torch of the general type used as the specific unique torch T. To assure that only that type of torch is capable of communication with monitor M, line 60 is communicated to a password circuit 140 set to a series of different types of torches that are capable of activating monitor M. This type of special torch T is provided by program 142 so that the information on line 60 passed to the identification digital decoder 130 is the identity of torch T and the particular type of the torch. This password of the type of torch can be provided at register 100 as described in FIG. 3. Monitor M is informed of the specific torch T and the type having values stored in lookup table 120. Monitor M also includes an internal memory 150 connected by line 152 to the input decoder circuit 130 to obtain he identity of the specific torch. Thus, memory 150 stores information specific to the unique torch T. Memory 150 writes the identification code from memory 100 into a register and accumulates information developed by monitor M for the particular torch. The memory 150 has I/O line 154 to input and store information relating to the particular unique torch T and to output this stored information associated with a particular torch identified by the input decoding circuit 130. The stored data of a particular torch is outputted on I/O line 154. When torch T is a new torch or has been refurbished and therefore requires clearing of existing stored information in memory 150, the memory is reset by a program represented by gate 160 having output line 160a. A reset logic on line 160a resets memory 150 for the particular torch identified by the digital data on line 152. Gate 160 has a first input line 162 from decoder 164 for decoding the digital information on line 140a and providing a logic 1 on input 162 for the particular torch T connected to connector portion 80a. The other input to gate 160 is the logic on line 170 from the reset program 172. The program produces a logic 1 on line 170 when a new or refurbished torch T is first used in the combination illustrated in FIG. 1. Thus, the information on line 154 is the accumulated information for a particular torch T. When a new torch is used, a reset signal on line 160a resets memory 150 for the new torch. Monitor M then monitors the operation of the new unique torch T.

Monitor M has an internal program for monitoring the operation of each specific torch T identified by the code data, appearing in line 152. The type torch from the input code activates line 130a to select a program stored in lookup table 120. A variety of program architecture can be used for monitoring various conditions of torch T; however, in this first embodiment of the present invention, as illustrated in FIG. 1, communication line 154 reads the accumulated stored values for the torch identified by line 152 and writes additions to these stored values. This update procedure for historical data for unique torch T is obtained by outputting particular limit values for various parameters associated with the type of torch selected by password device 140. These limit values are outputted from lookup table 120 on line 200 and are separated by output circuits, not shown, for value limit select lines 200a, 200b, 200c and 200n. The data on these lines control comparator networks 210, 212, 214, and 216, respectively. Thus, the comparator networks monitor certain limit values from lookup table 120 associated with a particular type of torch and these limit values are used in the output program P of monitor M for the specific torch T identified by data on line 152. Comparator networks 210-216 have associated digital accumulators 220, 222, 224 and 226, respectively. In practice, at least one accumulator and comparator is used for practicing the first embodiment of the invention; however, preferably several comparators and accumulators are used so that many historical and operational characteristics of torch T can be monitored simultaneously. The accumulators are driven by inputs 230, 232, 234 and 236, respectively, driven by parameters and/.or events. Thus, the action signals on output lines 240, 242, 244 and 246 indicate when the associated comparator changes logic because the accumulator associated with the comparator exceeds the limit values outputted from lookup table 120. The action signal logic on lines 240, 242, 244 and 246 activate action identification registers 250, 252, 254 and 256, respectively. The state of these action registers is shown on associated display devices 250a, 252a, 254a and 256a, preferably located on a remote console; however, they can be associated with the welding system or actually displayed on the torch itself. All of these implementations of program P are within this first embodiment of the present invention. In the illustrated embodiment, the wire feed speed from the magnitude signal on line 34 is multiplied by time and directed by input line 260 to comparator 210. Thus, when the accumulated wire feed speed and time product reaches a given level from lookup table 120 as it appears on line 200a, the logic signal on line 240 changes state and records an action which, in this example, is a "replace tip" action. Thus, the amount of wire fed to the torch is used to determine when the contact tip of the torch should be replaced. In a like manner, the logic on line 240 is also directed to action identification register 260 by line 262. This action register indicates that the torch should be replaced. This action is revealed by display device 260a. In practice, either line 240 or line 262 is used to determine the action to be taken when a certain amount of wire has been driven through the torch T. Either the tip is replaced or the torch is replaced according to the particular action identification signal employed. Whenever motor 30 is started, the event is recorded in accumulator 222. A certain number of start events indicates when the tip should be replaced. When this number is reached, the logic on line 242 is shifted to display a replace tip action requirement for torch T. In some instances, it is advantageous to measure the current of motor 30. Increased motor current is generally caused by liner friction in elongated gun G. Liner friction is the characteristic controlled by comparator network 214. Increase in the current of motor 30 is recorded. When the current reaches a certain level, the logic changes on line 244. In this instance, the accumulator 224 is merely recorded. When the current of motor 30 reaches a certain level, as found outputted from the lookup table for a particular type torch T, the logic on line 244 shifts. This indicates that the liner for torch T should be replaced. This is the message of action register 254. Thus, the parameters of torch T monitored by monitor M can either be an arithmetic magnitude or an accumulated level. A generic use of the present invention for parameters is indicated by the last example. Comparator network 216 is actuated by any parameter "n" associated with use of torch T. The accumulated amount of parameter n is compared to a level or value for parameter n on line 200n. This generic parameter can be current multiplied by time to indicate the amount of energy processed by the unique torch T. Other parameters are within the intent and scope of the invention. The parameters and events shown in FIG. 1 are only representative of the nature and of the type of historical information of torch T contemplated in practice at this time. Whenever torch T is connected to the welding system A, the output from I/O line 154 updates all of the accumulators to the value stored in memory 150 for the particular torch. Memory 150 maintains a history of torch T for each of the parameters and events in program P. When the torch has been refurbished or a new torch is inserted with the same identification number, memory 150 is reset by a program represented by gate 160, as previously described.

In accordance with an aspect of the invention, monitor M also provides life meter 300 determining the remaining anticipated life of the torch T before it should be replaced. Life meter 300 includes register 302 that decreases from 100% to 0% by sensing the output of one of the accumulators. As illustrated, the accumulator 220 is read by line 304, together with the limit value for the product of wire feed speed and time. This value appears on line 306. The output of register 302 indicates the amount of life remaining for the particular torch T. This life percentage is displayed by device 308 or is recorded on torch T or with respect to torch T for future use in inventory management. Program P can take other forms; however, the computer program, as described, is the preferred implementation of the first embodiment of the invention.

In accordance with another aspect of torch T, it has a separate and distinct function wherein the torch is connected to the welding system A to provide parameters on designated line 62. Parameters, in digital format, are selected in torch T and transmitted by line 62 to set-up circuit 50 of controller 42. In this separate and distinct function of torch T, the torch is a companion to system A. Communication lead 62, runs through elongated gun G from the front end at torch T to the rear end at connector portion 80b. Since system A has receptacle component of connector portion 80b, it can communicate with torch T by designated line 62. This line communicates parameters that are used by controller 42 to cause the desired selected welding process to be determined by information from torch T. In accordance with this feature of the first embodiment, torch T is constructed as shown in FIGS. 1 and 2. An index device 320 progresses through menu 322 by index commands on line 320a, as best shown in FIG. 2. The menu indexes between the process to be performed and the diameter or type of wire to be used. According to the indexed position on menu 322, a signal through line 332 corresponds to the desired process and wire diameter and/or type and is provided from menu 322. This data signal is communicated with a programmable set circuit or memory 330. This set circuit or memory outputs parameters, such as current, voltage and wire feed speed, by line 334 to designated communication channel 62. In this way, parameters selected on the torch are communicated to input set up circuit 50. Thus, torch T is modified to set the welding process wire size and/or wire type by creating parameters used by controller 42 during the welding process. This is a separate and distinct feature associated with torch T. In accordance with this feature, the torch has a manual set up device or storage memory 330. This device stores the welding parameters for a given welding process as provided by the index position of menu 322. Line 334 communicates the selected, stored parameters from device 330, in digital format, to line 62 for communicating the stored parameters from the torch to controller 42. This structure sets parameters into the processing unit of controller 42 by circuit 50. Thus, parameters stored in torch T are used by the controller to implement a desired welding process. The same torch has an identification code in register 100 which is communicated with the controller through monitor M. In practice, menu 322 and menu indexer 320 are part of the torch; however, they can be separate from the torch.

Figure 3:
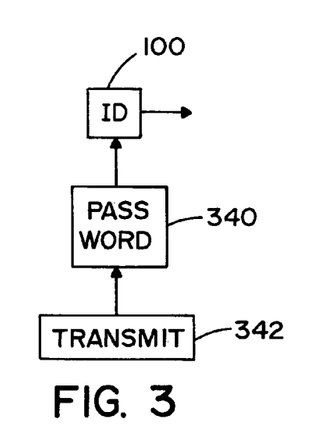
FIGS. 3 and 4 are block diagrams illustrating representative techniques for loading identification codes into the torch shown in FIGS. 1 and 2.
Figure 4:
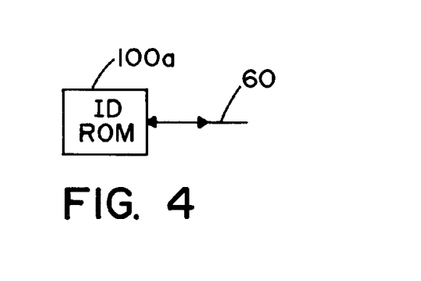

As shown in FIG. 1, password device 140 adds to the identification code a password for the classification or type of torch attached to system A by connector 80a, 80b. In FIG. 3, this torch type code is loaded into identification register 100 from a password device 340 by transmit device 342. In a like manner, the register 100a can be a read only memory which is loaded at the manufacturer and read from line 60 to set decoder 130 of monitor M. The manufacturer can also load a type code with a torch identification code in read only memory 100a. These two modifications of the code read/write register 100 and read only memory 100a are illustrated in FIGS. 3 and 4. These showings are representative of various schemes for loading the torch code and type code into the data storage device in read only memory 100a for communication from torch T to system A. Other minor changes in the first embodiment of the invention shown in FIGS. 1 and 2 and the modifications regarding communication of parameters to system A can be made without departing from the intended spirit and scope of the first embodiment of the invention.

Figure 5:
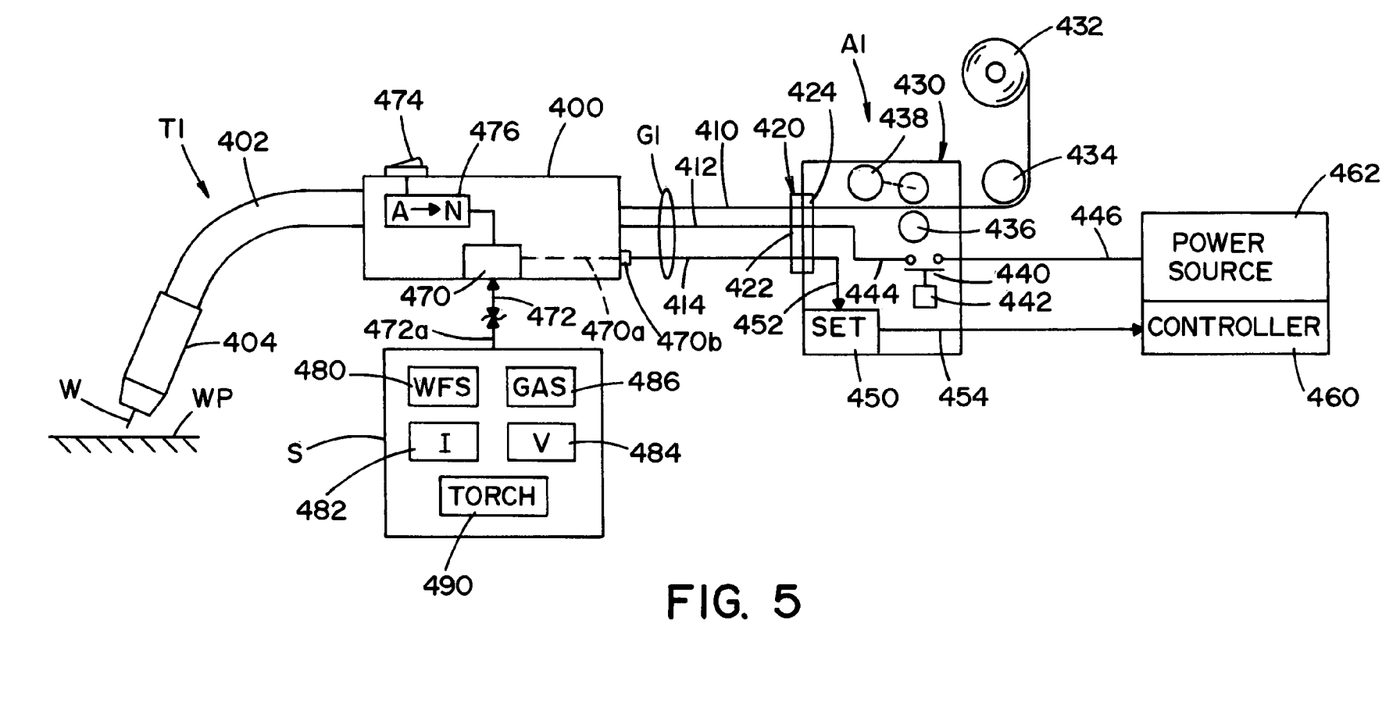
FIG. 5 is a schematic, combined wiring diagram and block diagram illustrating a second embodiment of the present invention.

The present invention involves connecting a specially designed torch with a specially constructed welding system so that communication occurs between the torch and system to enhance overall efficiency and control of the welding process accomplished by operating the welding system. In FIG. 5, a second embodiment of the invention is illustrated. This is the preferred embodiment. Unique torch T1 has set up devices for manually selecting weld parameters for the welding process. A line 472 communicates selected parameters, in digital format, to the torch T1. Line 414 communicates the torch stored parameters, in digital format, from torch T to the controller 460 whereby the torch stored parameters are used by the controller to implement the process. To accomplish this objective, the rear end of the gun G1, including torch T1, includes a connector 420 with a plug 422 matching a companion adapter 424 on the welding system. Thus, the relationship between torch T1 and system A1 is such that the torch can control at least some of the parameters used in the welding system. These parameters are manually set, at the torch, by selector device S.

Details of this second embodiment of the invention are shown in FIG. 5. Torch T1 has handle 40 terminating in gooseneck 402 with end nozzle 404. This torch is the front end of elongated gun or cable G1 housing power lead 412, welding wire 412 and communication line or channel 414. Of course, gas is communicated through gun G1 to torch T1 when shielding gas welding is being performed. To assure that the proper torch is connected to dedicated welding system A1, a connector 420 has an input side or plug 422 at the rear end of gun G1 and an output side or receptacle 424. This connector is used at the intersection between gun G1 and welding system A1. The prong or pin pattern of input 422 matches the prong or pin pattern of output 424. Consequently, the proper torch and system are connected. The attributes and features of novel torch T1 are, thereby, facilitated. In accordance with somewhat standard practice, welding system A1 includes wire feeder 430 having a supply reel 432 of welding wire W. The wire is pulled over capstan 434 by feed rolls 436 to push wire W through gun G1 to torch T1 at a speed WFS determined by wire feed motor 438 controlled by a microprocessor in accordance with the description of the first embodiment illustrated in FIG. 1. Contactor 440 is standard and includes solenoid 442 to activate contactor 440 when the trigger (not shown) on handle 400 is depressed to close contactor 440. Of course, a trigger lead passes through gun G1 when the torch is used for a manual welding operation. The starter system for automatic welding, such as used with a robot, merely closes contactor 440 by a solenoid 442 in accordance with a start signal. When contactor 440 is closed, lead 444 which is an extension of power lead 412 is connected to lead 446 from power source 462. Wire feeder 430 also includes an input set circuit 450 which may or may not have a code enabling front end, but does have an input 452 which is an extension of communication line 414 and an output line 454, which is a line connected to controller 460 for power source 462. Thus, lead 454 from circuit 450 sets selected parameters or operating features of power source 462 by inputting digital information to controller 460. Power source 462 outputs welding current on line 446. Parameters necessary for performing a selected welding operation between wire W and workpiece WP are stored in torch T1.

In accordance with the second embodiment of the invention, torch T1 includes a digital register 470 having a write line 472 to write data information into the register from selector device or set up device S and a read line 470a attached by connector 470b to communication line 414. Devices can be part of the torch or a separate unit as illustrated in FIG. 5. Buttons 480, 482 and 484 are capable of setting certain weld parameters, such as wire feed current and voltage, for communication with controller 460 by line 414 from torch T1. Furthermore if a particular gas is to be employed, button 486 is adjusted to select the desired gas, which is normally $CO_2$ and/or argon. Optionally, this button can adjust the rate of flow of the gas, as digital data, loaded into register or memory device 470 through write line 472. If a separate unit, device S has output terminal 472a for information transfer to line 472. When using torch T1, set up device or selector device S is manually adjusted by buttons 480, 482, 484 and 486 to provide the desired parameter for the welding operation of system A. Representative parameters are illustrated; however, a person skilled in the art could select other parameters to be controlled by a manual loading of register 470 on torch T1. In some implementations of this second embodiment, device S includes a button 490 for creating an identification code that is also written or loaded into register 470 to be communicated to the front end of set circuit 450. This code identifies a type of torch, but not a specific torch. By using this type code, set circuit 450 has a decoder front end and is enabled only upon receipt of a given type code by way of line 414 from memory register 470. This second embodiment of the invention allows adjustment of the desired welding parameter at the torch, either by a unit S formed integrally with the torch or by a separate unit S remote from the torch. A remote unit communicates with the torch by read line 472a during the setting operation.

The second embodiment provides unit capabilities. By storing parameters in register 470, torch T1 will automatically load parameters into controller 460 by merely connecting the torch to the welding system. To enhance this capability, a toggle mechanism 474 indexes menu storage device 476 to change the parameters stored in register or memory device 470. Device S can be a personalized POD which is loaded by a welder to a devised parameter set. Thus, the welder merely selects a torch and loads his parameters through line 472. Torch T1 will always be set into a condition preferred by the welder.

By using the invention a set of parameters can be loaded into any torch so the torch controls the weld process. In an alternative, the stored parameters of a torch can be changed as desired by any weld process. Other capabilities will be apparent to a person skilled in the welding art.

Figure 6:
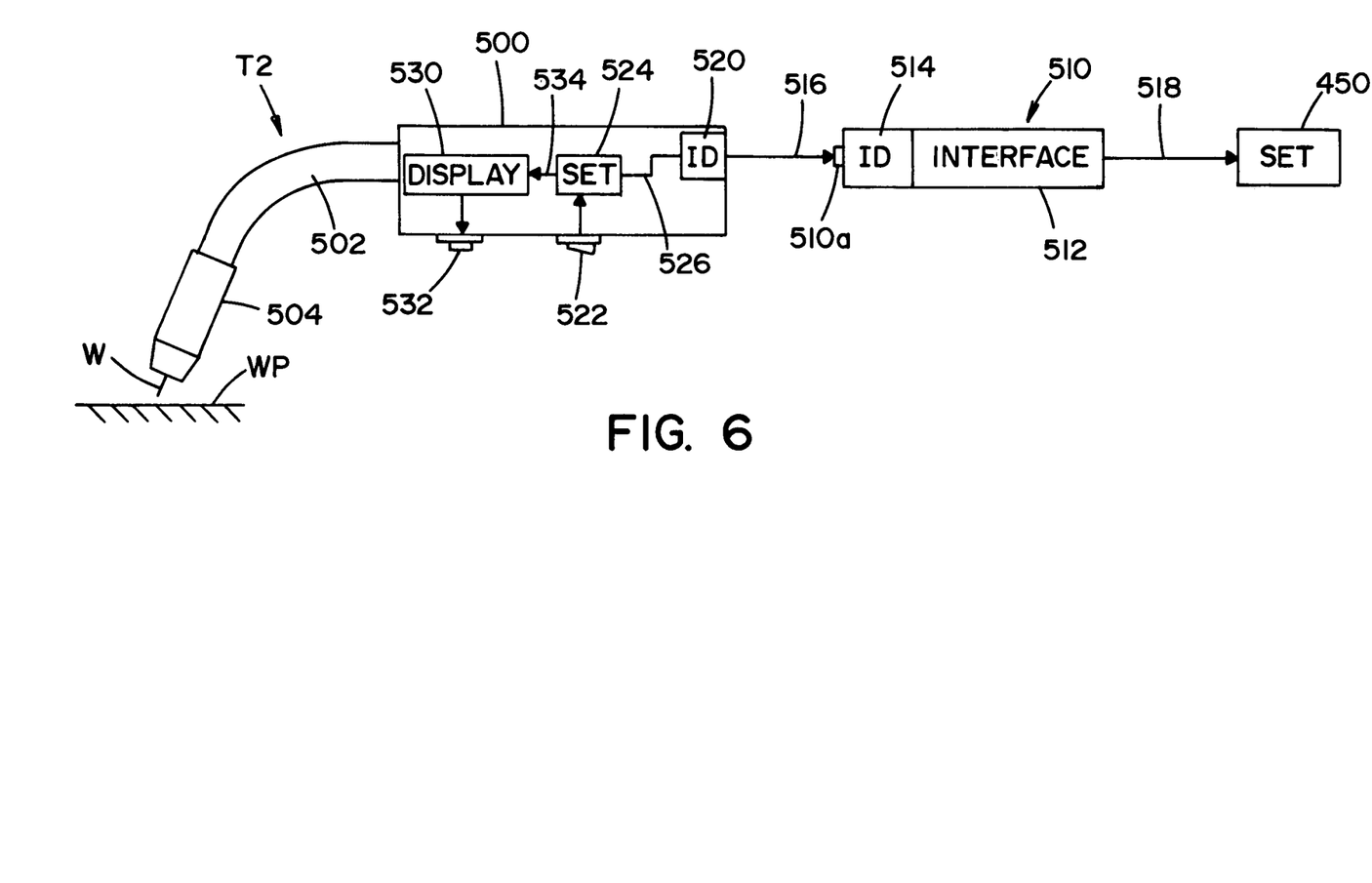
FIG. 6 is a schematic, combined wiring diagram and block diagram illustrating a third embodiment of the present invention.

A third embodiment of the present invention is illustrated in FIG. 6. This embodiment is somewhat similar to the second embodiment of the invention shown in FIG. 5 and has a common welding system and involves the same input set circuit 450. Attachment of torch T2 activates a desired welding process with selected parameters. To accomplish this objective, torch T2 includes a handle 500 having an outwardly projecting gooseneck 502 terminating in nozzle 504 for performing the welding operation between wire W and workpiece WP. In accordance with this embodiment, the rear end of the gun is connected to an interface module 510 having a storage output section 512 and an input identification circuit 514 to activate storage section 512 when receiving a selected code appearing on line 516 extending through the gun frp, torch T1. This gun is modified to communicate the identification code by line 516 when the torch is connected to the welding system. Thus, mere connection of the torch causes the input section 514 to activate interface module 510 for outputting digital data from section 512 on line 518. The data changes the parameters in set circuit 450 which is the same set circuit as shown in FIG. 5. Interface 510 is activated, in the preferred embodiment, by merely connecting line 516 to the module; however, in a practical implementation, line 516 is a communication channel between torch T2 and interface module 510 and receives digital data code from register 520 of torch T2. This register in one implementation merely stores a code. A code in digital format is communicated between register 520 and input identification circuit 514. In this implementation of the third embodiment, merely connecting torch T2 to the welding system activates module 510 because the code from the torch is identified by input circuit 514. In summary, section 512 is activated in one example by merely connecting the torch to the interface at the input side of the welding system. As illustrated, section 512 is activated by section 514 reading a specific code from the attached torch. Thus, the code for any torch used in these examples must have a special connector 510a. In the second example it must also have the ability to transmit a code recognizable by decoder section 512 of interface 510.

In accordance with another aspect of this third embodiment, storage memory register 520 is a read/write register so parameter toggle mechanism 522 is toggled to select desired parameters, such as the parameters shown in device S of FIG. 5. These parameters, after being selected and stored in memory circuit 524, are written into storage memory or register 520 from set circuit 524 by write line 526. In accordance with another aspect, handle 500 includes a register 530 to display the selected parameters on visual device 532. The visual data is based upon the data received from set circuit 524 through write line 534.

The third embodiment employs an interface module 510 that stores parameters for the welding process to be performed by the welding system. Module 510 has a front end for activation of the interface only when the front end receives selected input code from torch T2 attached to the front of the module. Torch T2 has a stored identification code in register 520 wherein the stored code matches the selected input code of circuit 514. By communication of a proper code from torch T2 to circuit 514, module 510 is activated. As a further aspect torch T2 has structure on the torch which structure includes a device for changing the stored parameters in section 512 of module 510. In a simplified version, the code concept is replaced by merely actuating the module by attaching the torch.

Figure 7:
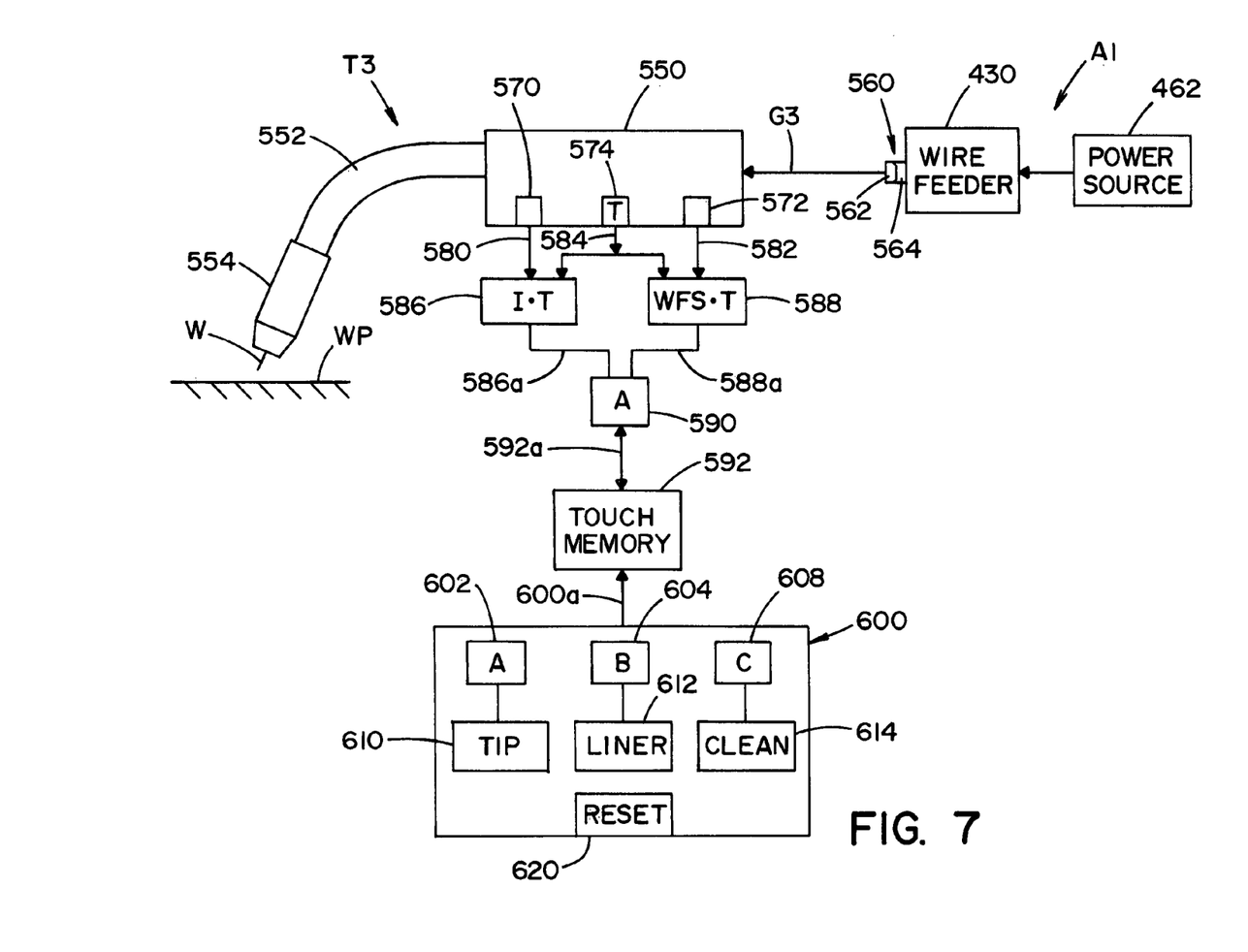
FIG. 7 is a schematic, combined wiring diagram and block diagram illustrating a fourth embodiment of the present invention; and, FIG. 8 is a schematic, combined wiring diagram and block diagram illustrating a fifth embodiment of the present invention.

The fourth embodiment of the present invention is illustrated in FIG. 7. Welding torch T3 is attached to welding system A1, as shown in FIGS. 5 and 6 and having wire feeder 430 and a power source 462. Torch T3 comprises handle 550 with gooseneck 552 and terminal end nozzle 554 and is connected to system A1 by gun G3 terminating in connector 560 having an input plug 562 and an outlet receptacle 564. This same type connector is used in the other embodiments of the present invention. The plug and receptacle have matching prong or pin patterns to assure component matching for proper coordination between the torch and the welding system. In this fourth embodiment, torch T3 includes a first sensor 570 for sensing a parameter illustrated as the welding current. Second sensor 572 senses another parameter indicated as wire feed speed. These two parameters are representative in nature to define the inventive characteristics of this embodiment. The sensors are coordinated with timer 574 so output lines 580, 582 and 584 have a combined parameter and time signal. Multiplication circuit 586 multiplies the value of arc current on line 580 by time of the current flow based upon reading from timer 754 as indicated by line 584. Thus, the output of circuit 586 on line 586a is the arc current multiplied by time during which current has been flowing through torch T3. In a like manner, multiplication circuit 588 multiplies a second parameter, indicated to be wire feed speed, by the time on line 584 so the value on output line 588a is the accumulated amount of wire fed through torch T3. Consequently, the magnitude of signals on lines 586a and 588a are indicative of use factor measurements for torch T3. These use factor measurement signals are accumulated in accumulator 590 and are read and reset by a memory device, shown as touch memory 592 through line 592a. Consequently, use factor signals accumulated for the two use related conditions are readable from storage and output device 592. The storage and output device is interrogated by monitor unit 600 containing stored levels associated with the two use factor signals from accumulator 590. This structure is similar to the structure and function illustrated and discussed with respect to the invention shown in FIG. 1. Comparator networks 602, 604 and 606 read the accumulated use factor signals in accumulator 590 by way of storage and memory device 592 to create action commands that are displayed on device 610, 612 and 614. In this manner, monitor unit 600 reads the use factor signals for torch T3 and displays the actions to be taken with respect to this torch. Unit 600 can be mounted at a remote console or at the welding operation. Accumulator 590 maintains the history of the use criteria for torch T3 until the accumulator is selectively reset. Reset is accomplished by a button 620 on monitor unit 600. Upon depressing button 620 and connecting unit 600 with accumulator 590 as illustrated by line 600a, accumulator 590 is reset for the particular torch T3. In this manner, the history of the torch T3 is maintained until the torch is refurbished or otherwise rehabilitated. Torch T3 has sensors 570, 572 to measure the level of current and the wire feed speed. It also has a timer 574 and a circuit 586 or 588 to combine one of more of these measurements as a product of time to develop one or more use factor signal or signals. Memory unit 592 accumulates the use factor signals so monitor unit 600 can read the use factor signals selectively for a given torch.

Figure 8:
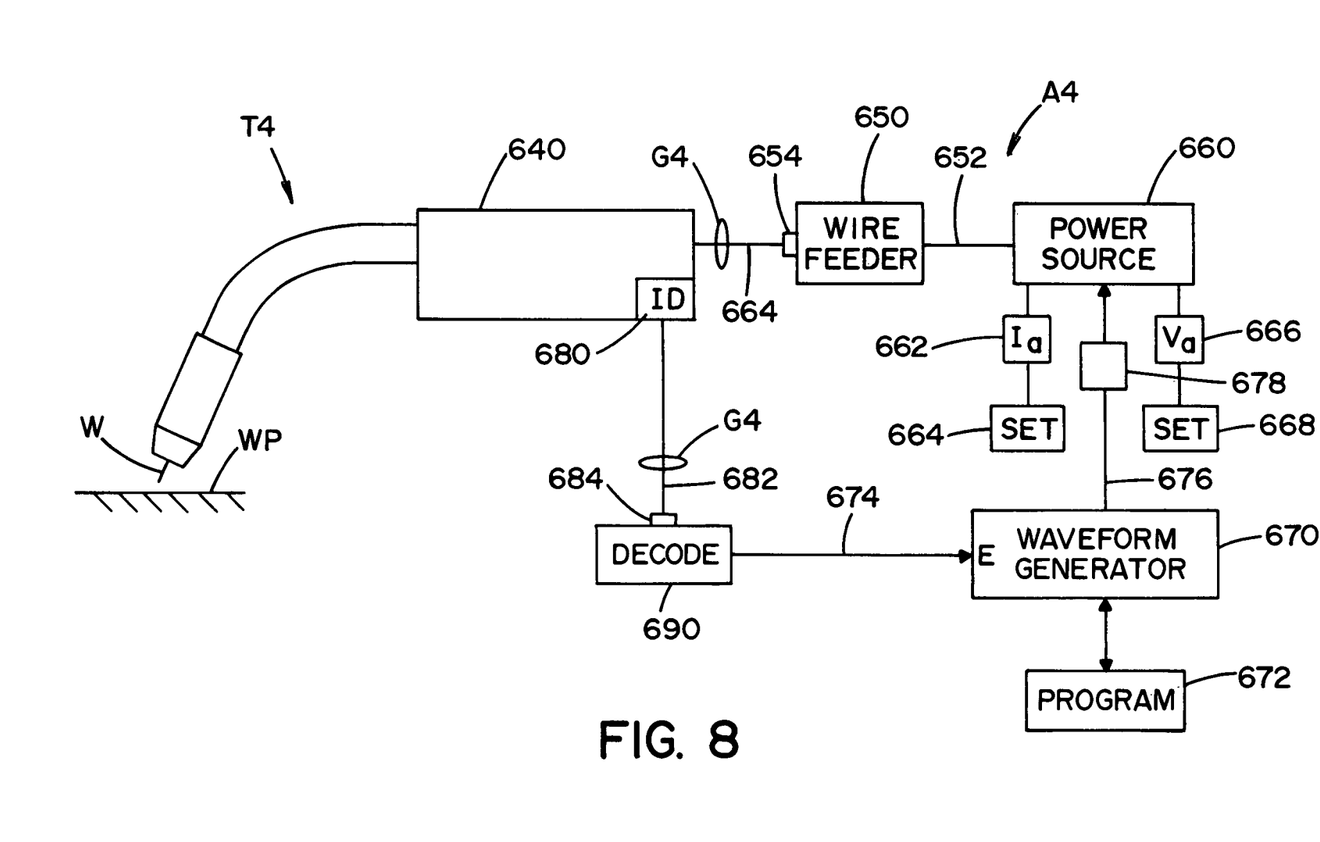

The fifth embodiment is schematically illustrated in FIG. 8. Welding torch T4 has a handle 640 connected by gun G4 to welding system A4 which includes a wire feeder 650 and a power source 660. Power lead 652 is directed from power source 660 through wire feeder 650 to the power lead 664 in gun G4. Power source 660 is operated in accordance with standard practice with a standard controller. Arc current 662 is set by circuit 664. In a like manner, the arc voltage stage 666 is set by circuit 668. As so far described the controller of the power source 660 and also wire feeder 650 operates in accordance with standard practice by either current or voltage feedback. To illustrate the inventive nature of torch T4, power source 660 has a separate and distinct operating system, illustrated as a system using waveform generator 670 to process a selected waveform program from one of the stored programs in module 672. Thus, the power source has a standard operating procedure and a second control arrangement illustrated as a network including a waveform generator and other related well known components for using a waveform generator. See Fulmer U.S. Pat. No. 6,498,321 which is incorporated by reference. Network including generator 670 is enabled by a signal in line 674. To create this signal for shifting from standard operation to the special network operation, novel torch T4 is employed. Handle 640 includes a stored identification code in read/write register 680 which is communicated by line or channel 682 through the gun G4 to the welding system A4. The input of the welding system for line 682 is a connector 684 having a unique plug and matching receptacle. The same connector is illustrated as connector 654 at the input feeder 650. The unique connector 684 directs the coded digital information on line or channel 682 to the input side of welding system A4 illustrated as decoder 690. When the proper signal is received by decoder 690 an enable signal in line 674 activates special process network 670. By using torch T4 attached to welding system A4, power source 660 is converted from a standard control operation to a higher level control protocol. Thus, gun G4 having a front end terminating at torch T4 is connected to welding system A4. The system automatically shifts into a high technology control protocol. The use of the high level protocol is indicated by line 676 extending from network 670. If this protocol is deactivated, a signal is directed to circuit 678 to shift from the high protocol to the normal operation for power source 660.

Several embodiments are described. It is intended that structural arrangements from any of these embodiments can be used in the other embodiments to develop a unique arrangement of a novel torch and a welding system coordinated with the torch to communicate information and control the operation of the welding system.

Having thus defined the invention, the following is claimed:

1. A particular torch for connection to an electric arc welding system having
   a wire feeder with a feed motor,
   a power source and a weld process controller for said power source to cause a selected weld process,
   said particular torch having a memory device storing a specific identification code unique to said particular torch and a transmission line to output said code in digital format,
   wherein said welding system has a torch monitoring device with an input terminal connected to said transmission line when said particular torch is connected to said system,
   said torch monitoring device having an input decode circuit to identify said particular torch and to activate a monitoring program tailored to said particular torch,
   wherein said monitoring device includes at least one accumulator to determine an accumulated total of a first torch use factor based upon a selected weld parameter, said selected weld parameter controlling said at least one accumulator is a parameter selected from the group consisting of wire use, feed motor starts, attained feed motor current, and a product of current and time,
   a circuit to enable said at least one accumulator upon connection of said particular torch to said terminal and an accumulator output signal representing said accumulated total of said first torch use factor based on said selected weld parameter,
   a program selected by connection of said particular torch to create a limit value of said accumulated total of said first torch use factor for said particular torch and a comparator network with a first input from said accumulator output signal and a second input,
   said second input being said limit value from said selected program and an output for creating an action signal when said output of said at least one accumulator reaches said limit value and said output signal changes logic when said limit value is reached from a lookup table, said output signal communicating with an activation action identification register, and
   said action signal of said at least one accumulator being displayed on at least one display device and indicating a corrective action to be taken upon reaching said limit value of said accumulated total of said first torch use factor for said particular torch.

2. The particular torch as defined in claim 1 wherein
said corrective action is an action selected from the group consisting of replace contact tip, replace liner, and rebuild or discard said specific torch.

3. The particular torch as defined in claim 1 wherein
said monitor device includes a plurality of said at least one accumulator wherein each accumulator is associated with a different weld parameter.

4. The particular torch as defined in claim 1 including
a circuit for selectively resetting at least one of said accumulators.

5. The particular torch as defined in claim 1 wherein
said torch includes a manually actuated input device on said torch to create a torch output signal with digital data identifying a specific weld process, said controller having a circuit for shifting said weld process of said controller and an input set circuit responsive to said digital data to set said weld process of said controller to said specific weld process.

6. The particular torch as defined in claim 5 wherein
said specific weld process is created based upon type of process and diameter of welding wire for said type of process.

7. The particular torch as defined in claim 6 wherein
said specific weld process is also created based upon the type of welding wire.

8. The particular torch as defined in claim 1 wherein
said monitoring device has a life meter with a first input being said accumulator output signal, a second input set by a value from said program and a second output signal representing a percentage of said output signal to said computer program value.

9. The particular torch as defined in claim 8 including
a device for recording said percentage and said particular torch as identified by said code.

10. The particular torch as defined in claim 5, wherein
one of said at least one accumulator comprises an accumulator for totaling a torch use factor at an output and a life meter with a first input being said accumulator output signal, a second input set by a desired life value for said torch and a second output signal representing the percentage of said output signal to said desired life value.

11. The particular torch as defined in claim 3, wherein
one of the plurality of said at least one accumulator comprises an accumulator for totaling a torch use factor at an output and a life meter with a first input being said accumulator output signal, a second input set by a desired life value for said torch and a second output signal representing the percentage of said output signal to said life value.

12. The particular torch as defined in claim 1, wherein
said at least one accumulator comprises an accumulator for totaling a torch use factor at an output and a life meter with a first input being said accumulator output signal, a second input set by a desired life value for said torch and a second output signal representing the percentage of said output signal to said life value.

13. The particular torch as defined in claim 1 including an actuated element to transmit said identification code to said terminal.

14. The particular torch as defined in claim 13 wherein said identification code includes a password code identifying the type of said torch and said input decoder circuit includes a circuit to decode said password to activate a monitoring program determined by said type.

15. The particular torch as defined in claim 1 wherein said identification code includes a password code identifying the type of said torch and said input decoder circuit includes a circuit to decode said password to activate a monitoring program determined by said type.

* * * * *